United States Patent
Shaffer et al.

(10) Patent No.: US 9,876,860 B2
(45) Date of Patent: Jan. 23, 2018

(54) VARIABLE CAPTURE BETWEEN APPLICATIONS

(71) Applicant: Avaya Inc., Basking Ridge, NJ (US)

(72) Inventors: Shmuel Shaffer, Palo Alto, CA (US); Patrick Tendick, Basking Ridge, NJ (US); Sheldon Davis, Guelph (CA)

(73) Assignee: Avaya Inc., Basking Ridge, NJ (US)

( * ) Notice: Subject to any disclaimer, the term of this patent is extended or adjusted under 35 U.S.C. 154(b) by 391 days.

(21) Appl. No.: 14/063,285

(22) Filed: Oct. 25, 2013

(65) Prior Publication Data
US 2015/0120904 A1    Apr. 30, 2015

(51) Int. Cl.
| | | |
|---|---|---|
| *H04L 29/08* | (2006.01) | |
| *G06F 9/54* | (2006.01) | |
| *H04M 3/51* | (2006.01) | |

(52) U.S. Cl.
CPC ............ *H04L 67/148* (2013.01); *G06F 9/544* (2013.01); *H04L 29/08639* (2013.01); *H04L 29/08576* (2013.01); *H04L 67/10* (2013.01); *H04L 67/14* (2013.01); *H04M 3/5166* (2013.01); *H04M 3/5183* (2013.01)

(58) Field of Classification Search
CPC ..... H04L 67/14; H04L 67/142; H04L 67/148; H04L 67/10; H04L 29/08576; H04L 29/08639; H04L 65/1083; H04M 3/493; H04M 3/4938; H04M 3/51; H04M 3/5166; H04M 3/5183; H04M 3/5191; G06F 9/544
USPC ............... 709/203, 224, 227, 228, 217, 219; 379/265.01, 265.02, 265.09, 266.1
See application file for complete search history.

(56) References Cited

U.S. PATENT DOCUMENTS

| | | | | |
|---|---|---|---|---|
| 6,058,424 A | * | 5/2000 | Dixon et al. .................. | 709/226 |
| 6,539,494 B1 | * | 3/2003 | Abramson et al. ............ | 714/4.3 |
| 6,600,736 B1 | * | 7/2003 | Ball ..................... | H04M 3/4938 |
| | | | | 370/352 |
| 6,938,085 B1 | * | 8/2005 | Belkin et al. ................. | 709/227 |
| 7,386,672 B2 | * | 6/2008 | Casazza ....................... | 711/129 |
| 7,681,184 B1 | * | 3/2010 | Weedon ................... | G06F 9/541 |
| | | | | 717/137 |

(Continued)

OTHER PUBLICATIONS

U.S. Appl. No. 14/050,604, filed Oct. 10, 2013, entitled: Sharing Dynamic Variables in a High Availability Environment.

*Primary Examiner* — Vivek Srivastava
*Assistant Examiner* — William C McBeth
(74) *Attorney, Agent, or Firm* — Sheridan Ross P.C.

(57) ABSTRACT

A first communication session is created with a first application written in first language. A change is detected in first variables in the first application. The first variables are retrieved from the first application in response to detecting a change in the first variables. The first communication session is transferred to a second application written in a second language. A change is detected in a second variable in the second application. The second variable is retrieved from the second application in response to detecting the change in the second variable. A common pair of variables are matched between the first variables and the second variable. The first communication session and the transferred first communication session are associated as a common communication session in response to matching the common pair of variables. One or more of the first plurality of variables is then used by the second application.

20 Claims, 4 Drawing Sheets

(56) References Cited

U.S. PATENT DOCUMENTS

| | | | |
|---|---|---|---|
| 8,104,024 B2* | 1/2012 | Berranger | H04M 3/4938 717/139 |
| 8,359,313 B2 | 1/2013 | Mui et al. | |
| 2003/0084165 A1* | 5/2003 | Kjellberg | H04L 63/08 709/227 |
| 2003/0110266 A1* | 6/2003 | Rollins et al. | 709/227 |
| 2005/0149630 A1* | 7/2005 | Smolinski | H04M 3/5191 709/227 |
| 2005/0198621 A1* | 9/2005 | Tillmann et al. | 717/128 |
| 2007/0083440 A1* | 4/2007 | Wirtz | G06Q 30/02 705/14.51 |
| 2007/0208862 A1* | 9/2007 | Fox et al. | 709/227 |
| 2008/0109796 A1* | 5/2008 | Kosche | 717/158 |
| 2008/0205626 A1* | 8/2008 | Mandalia | H04M 3/5191 379/265.09 |
| 2009/0161838 A1* | 6/2009 | Schultz | H04M 3/5166 379/88.04 |
| 2010/0024005 A1* | 1/2010 | Huang et al. | 726/3 |
| 2010/0310059 A1* | 12/2010 | Davis | H04M 3/4938 379/88.18 |
| 2011/0051918 A1* | 3/2011 | Fan | H04M 3/5166 379/211.02 |
| 2011/0055627 A1* | 3/2011 | Zawacki et al. | 714/15 |
| 2011/0219105 A1* | 9/2011 | Kryze | G06F 15/16 709/223 |
| 2011/0270613 A1* | 11/2011 | Da Palma | G10L 15/22 704/260 |
| 2012/0015640 A1* | 1/2012 | Brandes | 455/418 |
| 2013/0058465 A1* | 3/2013 | Catlin | H04M 3/4938 379/88.01 |
| 2013/0272511 A1* | 10/2013 | Bouzid | H04M 3/493 379/88.01 |
| 2014/0032964 A1* | 1/2014 | Neerincx et al. | 714/18 |
| 2014/0359735 A1* | 12/2014 | Lehmann et al. | 726/7 |

* cited by examiner

VARIABLE CAPTURE BETWEEN APPLICATIONS

TECHNICAL FIELD

The systems and methods disclosed herein relate to communication systems and in particular to capturing information between disparate communication applications.

BACKGROUND

One key feature of applications is that they capture various kinds of information. For example, a user may provide information to an automated system via a web site or via an Interactive Voice Response (IVR) system. The Web site or IVR session that collects the information may consist of several different applications. At times, it is difficult to share information collected in one application with other applications that are written in a different programming language or because they run in different execution contexts. Moreover, sharing the information between the applications may require the applications to be re-written for the specific function of sharing information with other applications. The writing and re-writing of applications is expensive, time consuming, and often times difficult to do, especially with older applications.

This problem becomes even more prevalent as messages transmitted during communication sessions are transferred between various disparate applications. Each application involved in a communication session must be re-written to share information with other applications. What is needed is a system that allows easy sharing of information between disparate systems without having to rewrite the code for existing applications.

SUMMARY

Systems and methods are provided to solve these and other problems and disadvantages of the prior art. A first communication session is created with a first application written in first language. A change is detected in first variables in the first application. The first variables are retrieved from the first application in response to detecting a change in the first variables. The first communication session is transferred to a second application written in a second language. A change is detected in a second variable in the second application. The second variable is retrieved from the second application in response to detecting the change in the second variable. A common pair of variables are matched between the first variables and the second variable. The first communication session and the transferred first communication session are associated as a common communication session in response to matching the common pair of variables. One or more of the first plurality of variables is then used by the second application.

DETAILED DESCRIPTION

Figure 1:
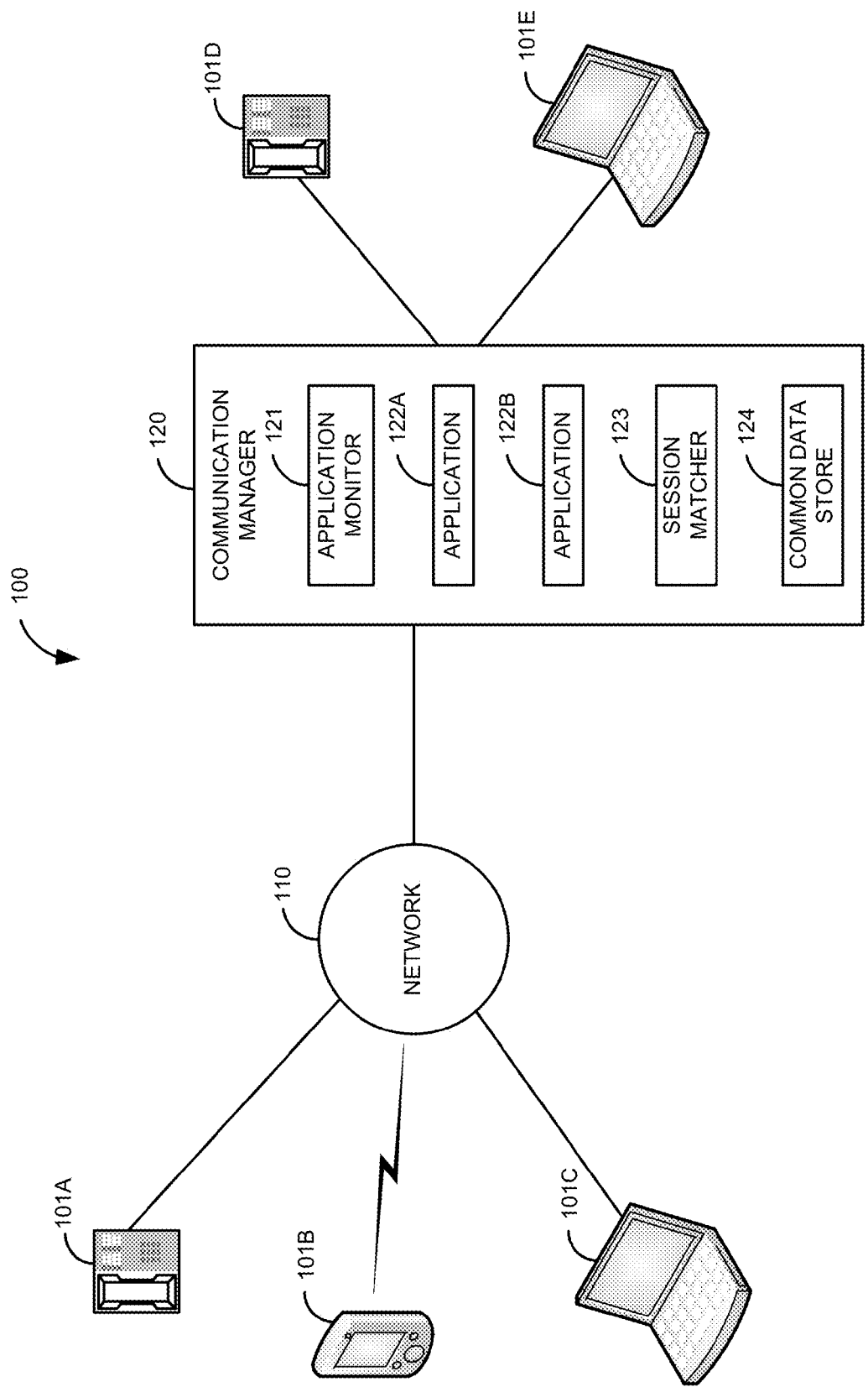
FIG. 1 is a block diagram of a first illustrative system for capturing variables between disparate systems

FIG. 1 is a block diagram of a first illustrative system 100 for capturing variables between disparate systems. The first illustrative system 100 comprises communication devices 101A-101E, a network 110, and a communication manager 120.

The communication devices 101A-101E can be or may include any device that can communicate on the network 110, such as a Personal Computer (PC), a telephone, a video system, a cellular telephone, a Personal Digital Assistant (PDA), a tablet device, a notebook device, and the like. In FIG. 1, the communication devices 101D-101E are shown connected to the communication manager 120. However, in one embodiment, communication devices 101D-101E can be connected to the network 110. In FIG. 1, there are five communication devices 101A-101E. In other embodiments, there may be more or less than five communication devices 101 connected to the network 110 and the communication manager 120.

The network 110 can be or may include any network that can send and receive information, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), and the like.

The communication manager 120 can be or may include any system for managing communications, such as a switch, a Private Branch Exchange (PBX), a session manager, a Session Initiation Protocol (SIP) switch, an email system, an Instant Messaging (IM) system, a video switch, a router, a web server, a combination of these, and the like. The communication manager 120 can manage a variety of communications, such as voice communications, video communications, web communications, multi-media communications, email communications, Instant Messaging (IM) communications, text communications, and/or the like. The communication manager 120 comprises an application monitor 121, applications 122A and 122B, a session matcher 123, and a common data store 124. Although elements 121-124 are shown as part of the communication manager 120, the elements 121-124 may be separate from the communication manager 120. The communication manager 120 is shown in FIG. 1 as a single element. However, in other embodiments, the communication manager 120 may comprise multiple elements that are distributed across the network 110.

The application monitor 121 can be any hardware/software that can monitor information in the applications 122A and 122B. The applications 122A and 122B can be any hardware/software that can be used in a communication session, such as an Interactive Voice Response (IVR) system, an application in a Back-to-Back User Agent (B2BUA), a web service, an email system, a voice communication system, a video system, a text messaging system, an Instant Messaging system, contact center application, a voice messaging system, a call forwarding application, an interactive text system, and/or the like. The applications 122A and 122B can be an application running in the communication device 101.

The session matcher 123 can be any hardware/software that can match communications sessions. The common data store 124 can be any hardware/software that can be used to store information, such as a disk, a disk array, a Random Access Memory (RAM), a RAM disk, a thumb drive, memory array, a server, and/or the like.

The communication device 101A initiates a communication session, such as a voice call to the communication manager 120. The communication manager 120 creates a first communication session with a first application 122A and the communication device 101A. For example, the communication manager 120 can create an Instant Message communication session between the communication device 101A and an Instant Messaging application 122A. Alternatively, the application 122A can be a web server application 122A that initiates a communication session between the communication device 101C web server application 122A. The first application 122A is written in a first programming language. The programming language can be any type of programming language, such as Java, C, C++, Java Script, shell, Voice Extended Markup Language (VXML), Perl, PHP, and/or the like.

The application monitor 121 detects a change in a plurality of variables in the first application 122A. A variable can include various kinds of variables, such as a caller identifier, one or more trunks (i.e., analog and/or digital trunks) associated with the communication session, a session identifier, a credit card number, a customer number, an account number, a caller name, a product name, a product type, a call creation time, a web access time, a Instant Messaging session identifier, an Instant Messaging session creation time, an email receipt time, a voice call time, and/or the like. The plurality of variables can include local variables (e.g., local to a specific function or method) and/or a global variables (e.g., one that is available throughout the application 122A).

The variables that the application monitor 121 detects can be defined in various ways. For example, the variables can be defined by a user in a profile. The variables can be defined based on an object, an object scope, and a variable name. For example, the object can be an object oriented programming object. The scope can be based on a Java package that contained the variable Customer ID (e.g., com.avaya.abc.xyz.CustomerID). The scope can be all the variables used in a specific function call (e.g., the scope is the function call). In an objected oriented programming language, such as Java or C++, a method of an object (or multiple methods of an object) can be the scope used to detect a change in variables. If multiple methods of an object are used, the application monitor 121 can capture the variables within one, some, or all of the multiple methods. The scope can be limited to values returned from a function or method. The scope can be based on a package. For example, if variable in a package is modified, then the application monitor 121 is notified of the change.

The application monitor 121 can detect a change in a variable in various ways. For example, the application monitor 121 can detect a change in a variable in a similar manner as a software debugger detects a change in a variable. This way, the existing code does not have to be rewritten, but may need to be recompiled. Upon detecting a write to the variable, the application monitor 121 is notified of the change and the nature of the change. A change in a variable can occur when the variable is first created or when the first application 122A changes a value of the variable. For example, the first application 122A could create a session identifier upon the creation of a communication session.

The application monitor 121 can detect the changes of different variables of the application 122A at different times. For example, when a communication session is first established with an IVR system (application 122A), the application monitor 121 can detect the creation of a session identifier. As the caller enters or speaks information about the communication session (i.e., an account number, a customer name, a product type, etc.), the application monitor 121 will detect these changes as they occur. As the changes occur, the application monitor 121 may retrieve the variables from the first application 122A. The application monitor 121 can retrieve the variables from the first application 122A in various ways, including by having the variables sent to the application monitor 121, getting the variables from the first application 122A, and/or the like. The first plurality of variables are stored in the common data store 124.

The communication session is transferred to a second application 122B that is written in a second programming language. Transferring the communication session to the second application 122B can be accomplished using the same or a different medium. As an example of transferring to a different medium, the first communication session may be a web communication session and transferring the communication session may comprise transferring the web communication session to a voice or video communication session. As another example of transferring to a different medium, the first communication session may be a voice communication session that is transferred to an Instant Messaging session. A communication session can be transferred from an agent application 122 to an entity, such as call queue in a contact center. A communication session may be transferred from an automated system, such as an Interactive Voice Response (IVR) system to an agent application 122. Transferring the communication session to the second application 122 may not cause the first communication session to end. For example, the first application 122 may be a web application 122 that is still active once the communication session is transferred to a voice session.

The application monitor 121 detects a change in a second variable in the second application 122B. The application monitor 121 stores the second variable in the common data store 124. In response to detecting the change in the second variable in the second application 122B, the application monitor 121 retrieves the second variable from the second application 122B. The session matcher 123 matches a common pair of variables between the first plurality of variables and the second variable. The common pair of variables can be any pair of variables that can be used to tie the first communication session and the transferred communication session as a common communication session. The common variables can be a trunk, a transferred time, a session identifier, an account balance, a call ID, a Universal Call ID, an account number, and/or the like. One way to associate a first communication session and a transferred communication session can be found in U.S. patent application Ser. No. 13/792,666 entitled "REPORTING ON CALL CENTER DATA ACROSS MULTIPLE CONCURRENT ACTIVITY SOURCES" filed on Mar. 11, 2013, which is incorporated herein by reference.

In one embodiment, the matched pair of variables can be the same variable. For example, the common pair of variables may be a common trunk (or trunk number) used for the first communication session and the transferred communication session. The common pair of variables may be an IP address of a communication device 101 that is used on the first communication session and the transferred communication session. Alternatively, the common pair of variables may be a session identifier, a credit card number, a customer number, an account number, a caller name, a product name, a product type, a call creation time, a web access time, a Instant Messaging session identifier, and/or the like.

In one embodiment, the session matcher 123 can match multiple pairs of common variables. For example, the session matcher 123 may match a trunk associated with the first communication session and a trunk of the transferred communication session along with a time of the transfer and a time of the transferred call being received.

In other embodiments, the common pair of variables that are matched by the session matcher 123 are not identical (i.e., their names and/or values are different). For example, the common variable may be a time that the first call was transferred and a time that the transferred call began. The times may not be exactly the same, but are close enough to determine that the first communication session and the transferred communication session are part of the same communication session. The common variable may be an Instant Messaging session end time and a start time of a voice communication session. The matching of variables can include matching variables that are within a predefined tolerance of one another. For example, the matched variables may be slightly different do the network delays, processing delays, differences in clocks, and/or the like.

To illustrate, consider the following example. An administrator defines that the application monitor 121 should detect changes for a web application 122A written in Hyper Text Markup Language (HTML) and Java Script. The web application 122A is used by customers to initiate a voice communication into a contact center application 122B that is used directs calls to agents in the contact center. The administrator has defined that the variables call_initiation_time, user_name, and product_type as the first plurality of variables associated with the web application 122A. The administrator has defined the variable call receive_time as the second variable for the second application 122B, which is a contact center application 122B written in C++.

The customer, via the communication device 101C, at the web application 122A (the first communication session) enters his name and the product type via the web application 122A. The change of the variables user_name and product_type are detected by the application monitor 121 and stored in the common data store 124. The user then selects a link to initiate a call to the contact center application 122B. The web application 122A sets the call_initiation_time variable to 1:45:01.01 PM. The application monitor 121 detects the change in the call_initiation_time variable in the web application 122A and stores the call_initiation_time variable in the common data store 124. The web communication session is transferred to the contact center application 122B. The contact center application 122B receives the incoming call and sets the call_receive_time variable to 1:45.01.02 PM. The application monitor 121 detects the change to the call_receive_time variable and stores the call_receive_time variable in the common data store 124. The session matcher 123 matches the common pair of variables between the web application 122A (the call_initiation_time of 1:45:01.01 PM) and the contact center application 122B (the call_receive_time of 1:45:01.02 PM) and matches the web application session with the incoming transferred voice call as a common communication session. This can be accomplished because of the small time difference between the two variables. The contact center application 122 then uses the customer_name and product_type variables from the web application 122A by giving the customer name and product type to an agent handling the incoming call at communication device 101E. The contact center application 122B can get the variables from the common data store 124 in various ways, such as by getting the variables directly from the common data store 124, receiving the variables from the application monitor 121, and/or the like.

The above system is described with two applications 122A and 122B where a communication session is transferred between the two applications 122A and 122B. However, the system could comprise additional applications 122 that may be part of the same communication session. For example, a communication session that was transferred from application 122A to 122B could be transferred to a third application 122C (not shown). In one embodiment, there is a common variable between the three applications 122 that can be used to associate the first communication session with the two transferred communication sessions into a common communication session. The first plurality of variables and the second variable could be retrieved and used by the third application 122C.

Alternatively, the variables used in the second transfer may be different than the variables used in the first transfer. For example, the first common variables for the first transfer could use an Automatic Caller Distribution (ACD) caller ID. The second common variables for the second transfer could be a universal session ID. For instance, the ACD caller ID could be used for transfers in a first contact center and the universal session ID could be used for transfers between contact centers.

Figure 2:
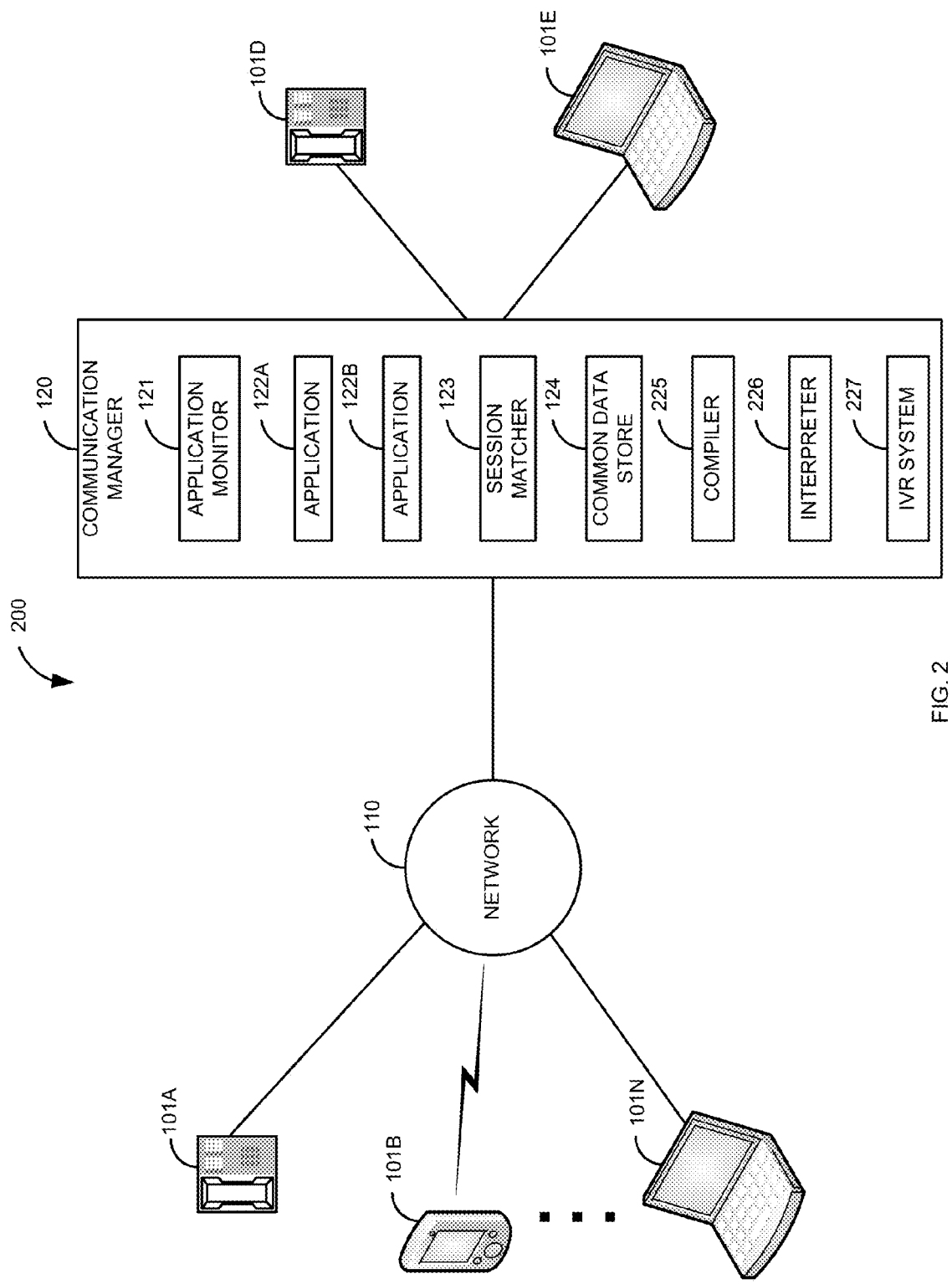
FIG. 2 is a block diagram of a second illustrative system for capturing variables between disparate systems.

FIG. 2 is a block diagram of a second illustrative 200 system for capturing variables between disparate systems. The second illustrative system 200 comprises communication devices 101A-101E, the network 110, and the communication manager 120.

The communication manager 120 comprises the application monitor 121, the applications 122A and 122B, the session matcher 123, the common data store 124, a compiler 225, an interpreter 226, and an Interactive Voice Response (IVR) system 227. The compiler 225 can be any software/hardware that can be used to generate the applications 122. The compiler 225 can generate executable code for the applications 122 from written code, such as C, C++, Fortran, Pascal, and the like. The interpreter 226 can be any software/hardware that can interpret code, such as Java, Java Script, Voice XML, Shell script, HTML, and/or the like.

The Interactive Voice Response (IVR) system 227 can be any software/hardware that can be used to handle voice calls. The IVR system 227 may receive input via a voice command, gesture inputs, via a Dual-Tone Multi-Frequency (DTMF) input from a user, and/or the like. The IVR system 227 is one example of an application 122.

The compiler 225, the interpreter 226, and the IVR system 227 are all shown as part of communication manager 120. However, in other embodiments, elements 225-227 may be distributed within the network 110 or in the communication devices 101.

The applications 122 and the IVR system 227 in many instances are separate programs that are typically written using different programming languages. For example, the IVR system 227 may be written using VXML and the application 122 may be written using Java, C, or C++. The applications 122 and the IVR system 227 are typically self contained in that the program variables (i.e., global variables, local variables, data structures, objects, etc.) are self-contained with the application 122. Normally, when these variables change or are created during the execution of the application 122, other applications do not have access to these variables.

The compiler 225 (e.g., a preprocessor), in one embodiment, is used to generate code that can detect changes to defined variables and send the changes to the application monitor 121. The compiler 225 can detect the changes in a similar manner to a debugger that breaks when a variable is written. Instead of breaking like in a debugger, the compiler 225 automatically modifies the code in the application 122. The modified code sends the changed/created variable to the application monitor 121. For example, if the variable was user_name, the modified code would send the variable user_name just after the user_name variable was modified in the code. By using this process, the code does not have to be rewritten.

In another embodiment, the interpreter 226 can also be used to detect changes to defined variables. As the code is being interpreted, the interpreter 226 automatically retrieves and sends the changed variables to the application monitor 121. In this example, the code does not have to be rewritten or recompiled.

To illustrate, consider the following example. The communication manager 120 is part of a contact center. The IVR system 227 (an application 122A) is used to handle incoming voice calls received from customers calling the contact center. The IVR system 227 was developed using the interpreter 226. The IVR system 227 uses the programming language VXML. The interpreter 226 is defined to send the variables user_name, user_comment, and incoming_trunk to the application monitor 121 when the variables are changed.

The application 122B is a contact center application 122 that was developed using the compiler 225. The contact center application 122B is designed to provide information to an agent that handles incoming voice calls. The contact center application 122B is written using the C programming language. The compiler 225 has inserted code into the contact center application 122B that sends the variable incoming_trunk to the application monitor 121 when the variable incoming_trunk changes.

The customer calls the contact center via communication device 101A. The communication manager 120 creates a first communication session with the IVR system 227. The IVR system 227 detects the incoming_trunk that is used to handle the incoming call and stores this in the incoming_trunk variable. The incoming_trunk variable is sent to the application monitor 121 by the interpreter 226. The application monitor 121 detects the change to the incoming_trunk variable. The application monitor 121 stores the incoming_trunk variable in the common data store 124. The customer, via the IVR system 227, states his name and provides a comment as to the purpose of the call. The IVR system 227 converts the user's name and comment into text and stores the converted text in the variables user_name and user_comment. The interpreter 226 sends the variables user_name and user_comment to the application monitor 121. The application monitor 121 detects the change and stores the variables user_name and user_comment in the common data store 124.

After completing the input to the IVR 227, the call from the customer is transferred from the IVR system 227 to the contact center application 122B by communication manager 120. This may be done directly or via a queue (not shown). The contact center application 122B detects the incoming_trunk variable when the call is transferred. The contact center application 122B, via code inserted by the compiler 225, sends the incoming_trunk variable to the application monitor 121. The application monitor 121 detects the change to the incoming_trunk variable for the contact center application 122B and stores the variable in the common data store 124.

The session matcher 123 matches the common pair of variables (e.g., the incoming_trunk variable from the IVR system 227 and the incoming_trunk variable from the contact center application 122B). The session matcher 123 can start the process of matching the common pair of variables based on the application monitor 121 detecting the changed incoming_trunk variable in the contact center application 122B. Since the trunk in both variables is the same trunk (or same trunk number), the session matcher 123 associates the first communication session (with the IVR system 227), and the transferred communication session to the contact center application 122B as a common communication session. The contact center application 122B gets the user_name and the user_comment variables and displays the information to an agent handling the call from the customer at communication device 101E.

In another embodiment, the session matcher 123 can access the common data store 124 and display a view of the common communication session. The session matcher 123 can display all the variables associated with the common communication for each leg of the common communication session. This feature can be useful in tracking trends or problems in communication sessions.

Figure 3:
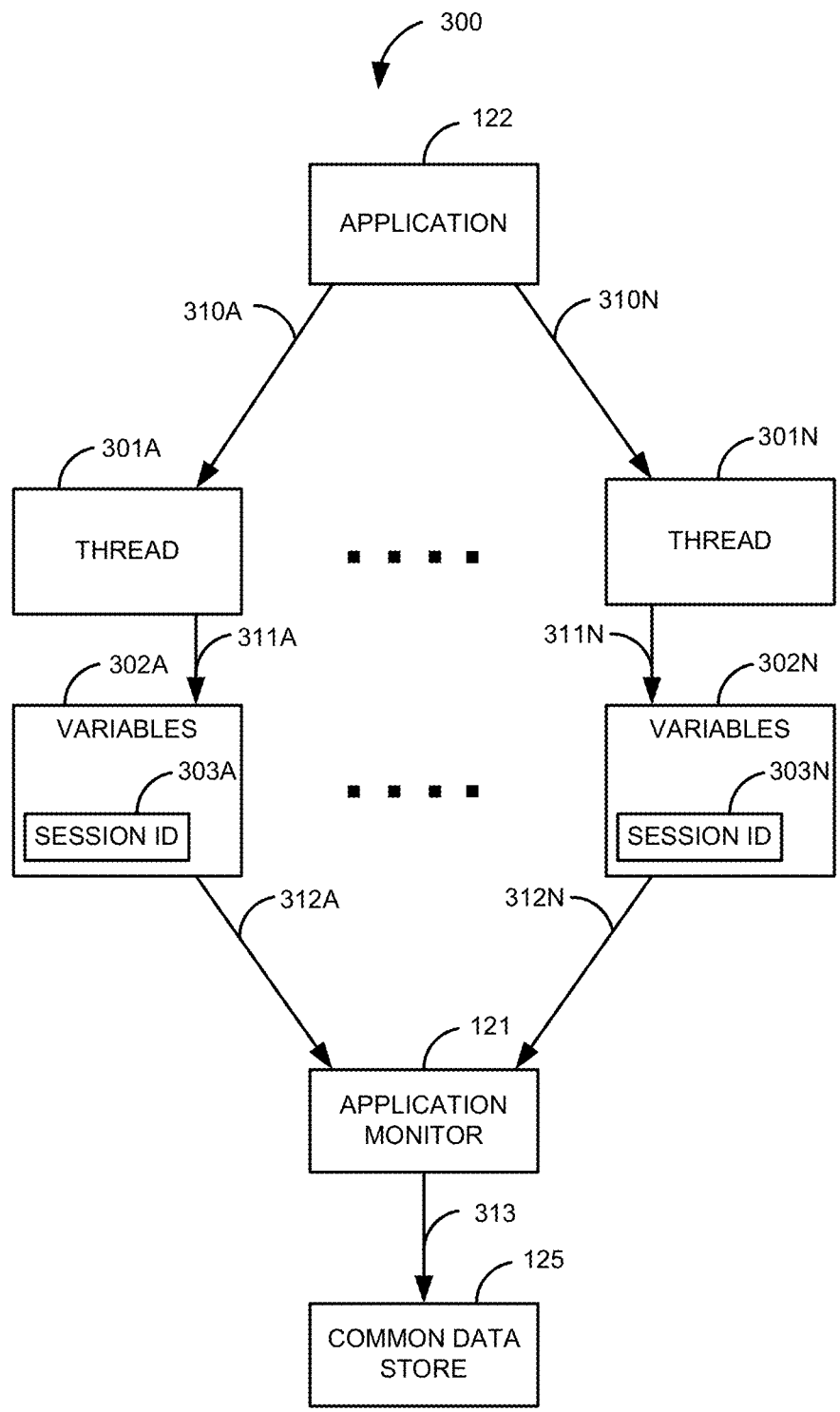
FIG. 3 is a block diagram for differentiating variables in a multi-threaded application.

FIG. 3 is a block diagram for differentiating variables in a multi-threaded application 122. Many applications 122 are written to be multi-threaded. In FIG. 3, any number of threads 301 can be spawned by the multi-threaded application 122 as illustrated by the ellipses between threads 301A-301N and variables 301A-301N. As an event occurs, the application 122 can spawn an identical thread 301 each time the event occurs. For example, the IVR system 227 can be a multi-threaded application 122 that spawns an identical thread 301 for each incoming voice call (communication session). If the IVR 227 is handling multiple calls at the same time, a unique identifier needs to be used in order to differentiate the variables from one thread to another because each thread uses the same set of variables.

To solve this problem, when the first call is received, the application 122 spawns a first thread 301A in step 310A. The thread 301A creates, in step 311A, a unique session ID variable 303A. The unique session ID variable is part of the plurality of variables 302A. When the thread 301A (or the interpreter 226) sends individual variables (or multiple variables) to the application monitor 121 in step 312A, the thread 301A (or the interpreter 226) also sends the unique session ID variable so that the application monitor 121 can track the variables 302A associated with the thread 301A.

When a second thread 301N is spawned in step 310N, the second thread 310N creates in step 311N a second unique session ID variable 303N that is part of the variables 302N. When the thread 301N (or the interpreter 226) sends individual variables (or multiple variables) to the application monitor 121 in step 312N, the thread 301N sends the second unique session identifier variable 303N so that the application monitor 121 can track the variables 302N associated with thread 301N. The application monitor 121 stores the variables 302A and 302N in the common data store 124 using the unique session ID variables 303A and 303N.

To illustrate, consider the following example based on the previous example used for FIG. 2. Customer A makes a call from communication device 101A to the IVR system 227, which spawns the thread 301A in step 310A. The thread 301A creates a unique session ID variable 303A that has a value of 1. The incoming_trunk variable (part of the variables 302A) is identified by the thread 301A as 100 in step 311A. The interpreter 226 sends the incoming_trunk variable (with a value of 100) along with the unique session ID of 1 to the application monitor 121 in step 312A. The application monitor 121 stores the incoming_trunk variable (with the value of 100) in a data structure in the common data store 124 that is identified by the unique session ID of 1 in step 313.

At this point, customer N makes a call from communication device 101B to the IVR 227, which spawns the thread 301N in step 310N. The thread 301N creates a unique session ID variable 303A that has a value of 2. The variable incoming_trunk variable (part of the variables 302N) is identified by the thread 301N as 200 in step 311N. The interpreter 226 sends the incoming_trunk of variable (with a value of 200) along with the unique session ID of 2 to the application monitor 121 in step 312N. The application monitor 121 stores the incoming_trunk variable (with the value of 200) in a data structure in the common data store 124 that is identified by the unique session ID of 2 in step 313.

As customer A enters his user name and comment; using the same process, the interpreter 226 sends the variables user_name and user_comment to the application monitor 121 along with the unique session ID variable of 1 in step 312A. The application monitor 121 stores the user_name and user_comment variables in the data structure identified by the unique session ID of 1 in step 313.

Likewise, customer B enters his user name and comment; using the same process, the interpreter 226 sends the variables user_name and user_comment to the application monitor 121 along with the unique session ID variable of 2 in step 312A. The application monitor 121 stores the user_name and user_comment variables in the data structure identified by the unique session IF of 2 in step 313.

User A is transferred to the agent and the agent is presented with the information associated with unique session identifier of 1 based on the common incoming_trunk variables. Likewise, when user B is transferred to another agent, the other agent is presented with the information associated with the unique session identifier of 2 based on a different common incoming_trunk variable.

In the above example, the session ID 303 is a variable that is used as a unique identifier for the thread 303. However, in other embodiments, other unique variables may be used, such as an incoming trunk number, a thread creation time, a thread identifier, or any identifier that is unique between threads 301.

Figure 4:
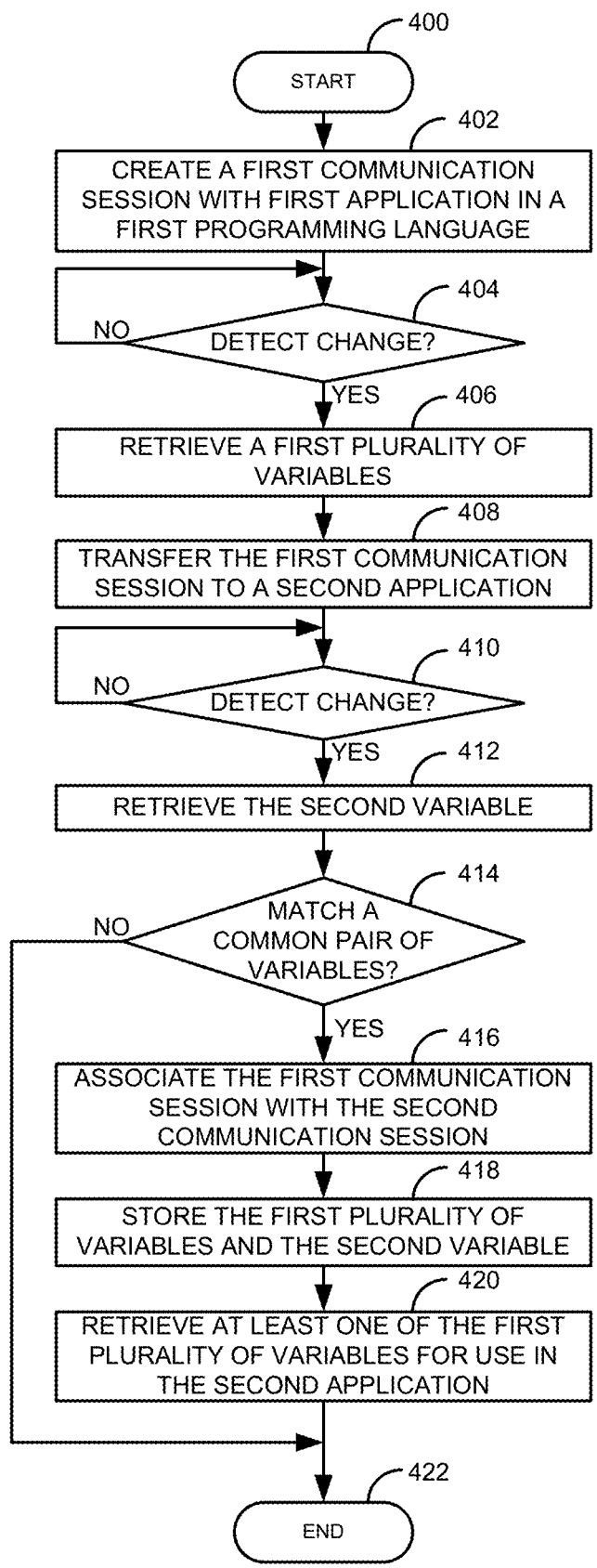
FIG. 4 is a flow diagram of a process for capturing variables between disparate systems.

FIG. 4 is a flow diagram of a process for capturing variables between disparate systems. Illustratively, the communication devices 101, the communication manager 120, the application monitor 121, the applications 122, the session matcher 123, the common data store 124, the compiler 225, the interpreter 226, and the IVR 227 are stored-program-controlled entities, such as a computer or processor, which performs the method of FIG. 4 and the processes described herein by executing program instructions stored in a tangible computer readable storage medium, such as a memory or disk. Although the methods described in FIG. 4 is shown in a specific order, one of skill in the art would recognize that the steps in FIG. 4 may be implemented in different orders and/or be implemented in a multi-threaded environment. Moreover, various steps may be omitted or added based on implementation.

The process starts in step 400. The process creates a first communication session between a communication device and a first application in step 402. The first application is in a first programming language. The process determines in step 404 if a change to a variable (or plurality of variables) in the first application has occurred. If a change has not occurred in step 404, the process repeats step 404. If a change in the variable (or plurality of variables) has been detected in step 404, the process retrieves the variable (or plurality of variables) in step 406. The steps of 404-406 may be repeated for different variables as the communication session with the first application is still active.

The first communication session is transferred to a second application in step 408. The process determines in step 410 if a change has been detected to a variable in the second application. If a change has not been detected to the second variable in the second application, the process repeats step 410. If the change has been detected to the second variable (or variables) in the second application in step 410, the process retrieves the second variable (or variables) from the second application.

The process determines in step 414 if a match can be made between a pair of common variables between the first plurality of variables from the first application and the second variable (or variables) from the second application. If a match cannot be made in step 414, the process ends in step 422. Otherwise, if a match is made in step 414, the process associates the first communication session with the transferred communication as a common communication session in step 416. The process stores the first plurality of variables and the second variable in the common data store in step 418. The second application retrieves at least one of the first plurality of variables for use in the second application in step 420 and the process ends in step 422.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method comprising:
   creating, by a microprocessor, a first communication session with a first application and a communication device of a user, wherein the first application is written in a first programming language;
   detecting, by the microprocessor, a change in a first plurality of variables in the first application;
   in response to detecting the change in the first plurality of variables, storing, by the microprocessor, the first plurality of variables in a common data store comprising a persistent set of variables associated with applications servicing communication sessions;
   transferring, by the microprocessor, the first communication session to a second application written in a second programming language;
   detecting, by the microprocessor, a change in a second variable in the second application;
   in response to detecting the change in the second variable, storing, by the microprocessor, the second variable from the second application in the common data store;
   matching, by the microprocessor, a common pair of variables between the first plurality of variables stored in the common data store and the second variable stored in the common data store, wherein matching the common pair of variables comprises matching a variable of the first plurality of variables and the second variable and wherein the variable of the first plurality of variables and the second variable have different values due to at least one of a network delay, a processing delay, and a difference in a clock; and in response to matching the common pair of variables, retrieving, by the microprocessor, the first plurality of variables stored in the common data store and using the first plurality of variables stored in the common data store in the second application.

2. The method of claim 1, wherein the first plurality of variables comprise one or more program variables created during execution of the first application and further comprising:

identifying, by the microprocessor during execution of the first application, the one or more program variables.

3. The method of claim 2, wherein the one or more program variables are stored in a computer readable medium as an identifier and a value, wherein the microprocessor reads the one or more program variables during execution of the first application, wherein the one or more program variables comprise one or more of a caller identifier, a trunk associated with the first communication session, a session identifier, a credit card number, a customer number, an account number, a caller name, a product name, a product type, a call creation time, a web access time, an Instant Messaging session identifier, an Instant Messaging session creation time, an email receipt time, or a voice call time, wherein the value of the one or more program variables changes during execution of the first application, and wherein the one or more program variables are identified through a debugging capability of the first application.

4. The method of claim 1, wherein the matched common pair of variables is one of a trunk, a transferred time, a session identifier, an account balance, a call ID, a Universal Call ID, or an account number, wherein the first application comprises a multi-threaded first application that spawns a plurality of identical threads in response to a plurality of initiated communication sessions, and wherein each of the plurality of identical threads use the first plurality of variables and further comprising:

differentiating, by the microprocessor, each of the plurality of identical threads that use the first plurality of variables based on a session identifier for a specific communication session of the plurality of initiated communication sessions.

5. The method of claim 1, wherein the first plurality of variables comprise both local and global variables and wherein the first programming language is voice extended markup language (VXML) and the second programming language is one of Java, C, or C++.

6. The method of claim 2, wherein the microprocessor identifies the one or more program variables by associating an execution of an interpreter with the first communication session with a communication device of a selected customer.

7. The method of claim 1, wherein the first plurality of variables are defined based on an object oriented programming object, a scope of the object oriented programming object, and a variable name used by the objected oriented programming object and wherein the scope is based on a method of the object oriented programming object and wherein the first plurality of variables are captured within the method of the object oriented programming object.

8. The method of claim 7, wherein the scope of the object oriented programming object is based on a plurality of methods of the object oriented programming object and wherein the first plurality of variables are captured within the plurality of methods of the object oriented programming object.

9. The method of claim 1, further comprising: automatically modifying, by the microprocessor, code of the first application to retrieve the first plurality of variables from the first application.

10. The method of claim 1, further comprising: automatically retrieving, by the microprocessor, the first plurality of variables from the first application without having to modify any code of the first application.

11. A system comprising:
a microprocessor; and
a computer readable medium, coupled with the microprocessor and comprising a common data store and microprocessor readable and executable instructions that cause the microprocessor to execute:
a communication manager that creates a first communication session with a first application and a communication device of a user, wherein the first application is written in a first programming language and transfers the first communication session to a second application written in a second programming language;
an application monitor that detects a change in a first plurality of variables in the first application, stores the first plurality of variables from the first application in the common data store in response to detecting the change in the first plurality of variables, detects a change in a second variable in the second application, and stores the second variable from the second application in the common data store in response to detecting the change in the second variable; and
a session matcher that matches a common pair of variables between the first plurality of variables stored in the common data store and the second variable stored in the common data store, wherein matching the common pair of variables comprises matching a variable of the first plurality of variables and the second variable and wherein the variable of the first plurality of variables and the second variable have different values due to at least one of a network delay, a processing delay, and a difference in a clock, retrieves the first plurality of variables stored in the common data store, and uses the first plurality of variables stored in the common data store in the second application.

12. The system of claim 11, wherein the first plurality of variables comprise one or more program variables generated during execution of the first application and wherein the microprocessor identifies, during execution of the first application, the one or more program variables.

13. The system of claim 12, wherein the one or more program variables are stored in the computer readable medium as an identifier and a value, wherein the microprocessor reads the one or more program variables during execution of the first application, wherein the one or more program variables comprise one or more of a caller identifier, a trunk associated with the first communication session, a session identifier, a credit card number, a customer number, an account number, a caller name, a product name, a product type, a call creation time, a web access time, an Instant Messaging session identifier, an Instant Messaging session creation time, an email receipt time, or a voice call time, wherein the value of the one or more program variables changes during execution of the first application, and wherein the one or more program variables are identified through a debugging capability of the first application.

14. The system of claim 11, wherein the second application retrieves at least one of the first plurality of variables to be used by the second application, wherein the first application comprises a multi-threaded first application that spawns a plurality of identical threads in response to a plurality of initiated communication sessions and wherein each of the plurality of identical threads use the first plurality of variables, and wherein the session matcher differentiates each of the plurality of identical threads that use the first plurality of variables based on a session identifier for a specific communication session of the plurality of initiated communication sessions.

15. The system of claim 12, wherein the microprocessor identifies the one or more program variables by associating an execution of an interpreter with the first communication session with a communication device of a selected customer.

16. The system of claim 11, wherein the matched common pair of variables is one of a trunk, a transferred time, a session identifier, an account balance, a call ID, a Universal Call ID, or an account number, wherein the first plurality of variables are defined based on an object oriented programming object, a scope of the object oriented programming object, and a variable name used by the object oriented programming object, wherein the scope of the object oriented programming object is based on a method of the object oriented programming object, and wherein the first plurality of variables are captured within the method of the object oriented programming object.

17. The system of claim 11, wherein the matched common pair of variables is one of a trunk, a transferred time, a session identifier, an account balance, a call ID, a Universal Call ID, or an account number, wherein the first plurality of variables are defined based on an object oriented programming object, a scope of the object oriented programming object, and a variable name used by the object oriented programming object, wherein the scope of the object oriented programming object is based on a plurality of methods of the object oriented programming object, and wherein the first plurality of variables are captured within the plurality of methods of the object oriented programming object and further comprising:
  a compiler that automatically modifies code of the first application to retrieve the first plurality of variables from the first application; or
  an interpreter that automatically retrieves the first plurality of variables from the first application without having to modify any code of the first application.

18. A system comprising:
a microprocessor; and
a computer readable medium, coupled with the microprocessor and comprising a common data store and microprocessor readable and executable instructions that cause the microprocessor to execute:
a communication manager that creates a first communication session with a first application and a communication device of a user, wherein the first application is written in a first programming language and transfers the first communication session to a second application written in a second programming language;
an application monitor that detects a change in a first plurality of variables in the first application, stores the first plurality of variables from the first application in the common data store in response to detecting the change in the first plurality of variables, detects a change in a second variable in the second application, and stores the second variable from the second application in the common data store in response to detecting the change in the second variable; and
a session matcher that matches a common pair of variables between the first plurality of variables stored in the common data store and the second variable stored in the common data store, wherein matching the common pair of variables comprises matching a variable of the first plurality of variables and the second variable and wherein the variable of the first plurality of variables and the second variable have different names and/or values, retrieves the first plurality of variables stored in the common data store, and uses the first plurality of variables stored in the common data store in the second application.

19. The system of claim 18, wherein the variable of the first plurality of variables is a time when the first communication session was transferred and the second variable is a time when the transferred communication session began.

20. The system of claim 18, wherein the variable of the first plurality of variables and the second variable have different names.

* * * * *